May 28, 1968     J. W. DODGE ET AL     3,385,712
METHOD OF MAKING AN EGG PRODUCT
Filed Oct. 7, 1965
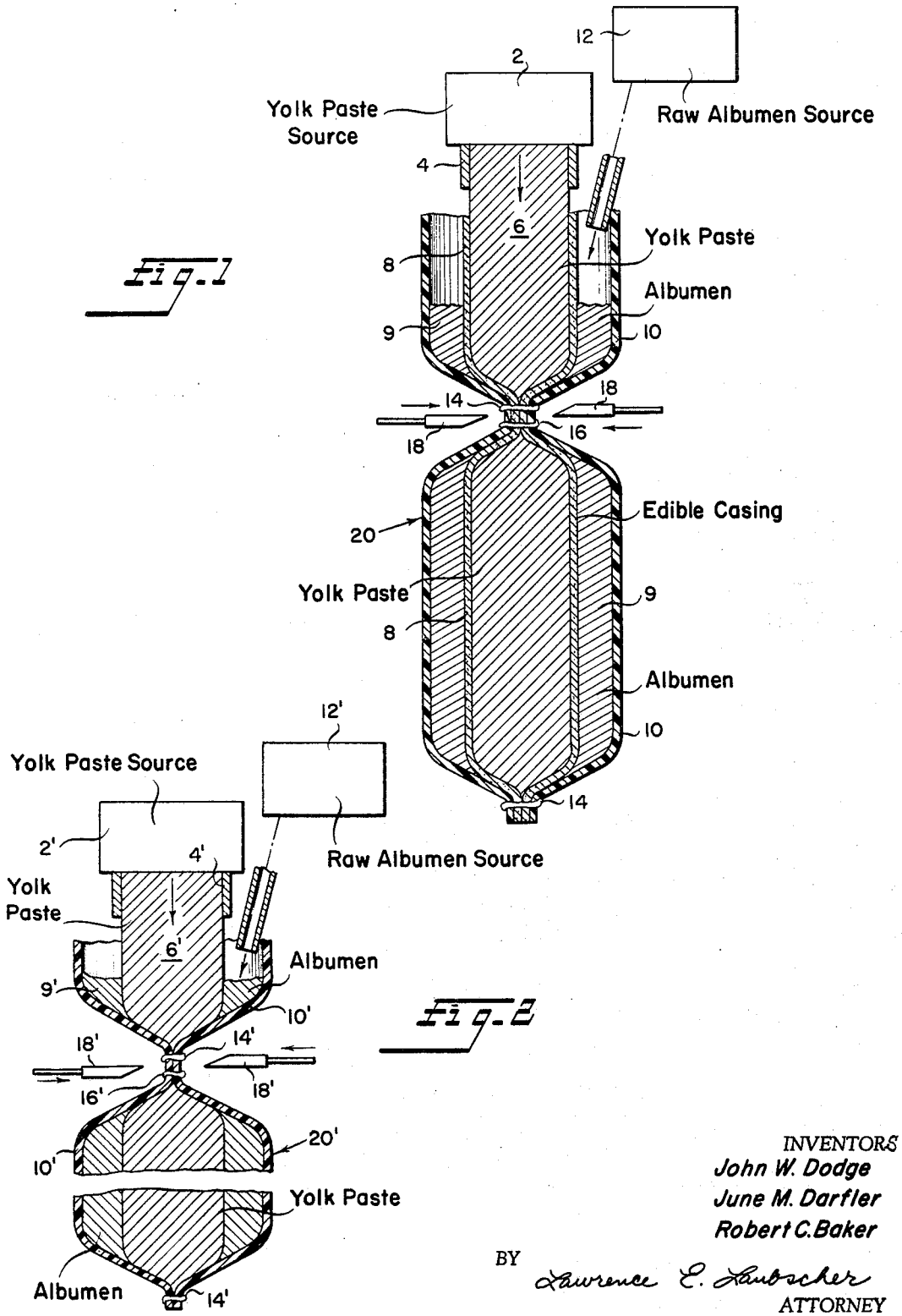
INVENTORS
John W. Dodge
June M. Darfler
Robert C. Baker
BY Lawrence E. Laubscher
ATTORNEY

United States Patent Office 3,385,712
Patented May 28, 1968

3,385,712
METHOD OF MAKING AN EGG PRODUCT
John W. Dodge, Ithaca, June M. Darfler, Locke, and Robert C. Baker, Groton, N.Y., assignors to Cornell Research Foundation, Inc., Ithaca, N.Y., a corporation of New York
Filed Oct. 7, 1965, Ser. No. 493,744
4 Claims. (Cl. 99—113)

ABSTRACT OF THE DISCLOSURE

A cooked egg roll product including a central egg yolk portion, and an outer egg white portion arranged concentrically about said egg yolk portion. During manufacture, the core portion is formed by extruding a yolk paste at least fifty percent of which, by volume, comprises completely coagulated yolk, the remainder of said paste comprising incompletely coagulated yolk.

---

This invention relates generally to an egg product, and to methods of efficiently and inexpensively producing the same. For example, the invention may be characterized by the provision of a central core consisting of a paste of wholly or partially cooked egg yolk about which is concentrically arranged a layer of albumen contained in a substantially impervious container. The packaged egg product, when refrigerated at a temperature of approximately 35° F. to 45° F. has a shelf life on the order of three months, and is particularly suitable for institutional feeding, commercial applications and domestic consumption.

Hard-cooked eggs are a food item common in the consumer diet. They are used for garnishes, salads, sandwiches, and as a luncheon item. Hard-cooked eggs are, however, only a semi-convenient item because of the cooking and peeling necessary in preparation, particularly in the institutional market. Attempts have been made, therefore, to produce a hard-cooked egg roll packaged in film which would represent enough convenience to both the housewife and the institutional trade to actually increase the sales of eggs.

In the prior art of egg roll manufacture, two general methods have been employed.

According to a known first method, high quality raw eggs are broken out of the shells into a trough or tube. These eggs pass down the tube into a bag (a substantially impervious container) with a diameter of approximately that of an egg. Plural eggs are thus placed in a bag, and the bag is clipped shut. The yolks of the eggs remain reasonably centered if the eggs are of uniformly high quality. The roll is then cooked at approximately 190° F. for twenty to twenty-five minutes, after which it is cooled slowly and stored. The shelf life of such a roll is up to three months and can only be attained if the cooking is accomplished after sealing the bag. Once the cooked egg white is subject to unpackaged handling, it perishes quickly. The disadvantages of this method of manufacture are (1) the labor involved in checking for yolks broken in the process, which would spoil the appearance of a whole roll, and (2) the requirement that only high quality eggs, graded for size, can be used.

A second method of producing the egg roll involves the use of a first tube arranged in concentrically-spaced relation within a second tube. As disclosed in the Gutmann Patent No. 2,421,199, the space between the tubes is filled with egg white that is then cooked. The first tube is then removed and egg yolk is placed into the space within the first tube, after which the whole product is cooked. In the product produced by this method, the egg yolk was found to be rubbery and flavorless; furthermore, since the resulting egg roll must be packaged after cooking, the product has a relatively short shelf life. The process is laborious and is confined to batch process methods. The present invention was developed to provide an improved method for producing a hard-cooked egg roll product, which method avoids the above and other drawbacks encountered in the prior art, particularly in regard to labor requirements and egg sizes to be utilized.

The primary object of the present invention is to provide a method of manufacturing an improved egg roll product, which method comprises the steps of wholly or partially cooking unbroken egg yolks, grinding or mashing the yolks into a thick paste, forming the paste into a central core arranged in spaced relationship relative to the walls of a substantially impervious container, filling the space about said core with uncooked albumen, hermetically sealing the container, and cooking the albumen to effect coagulation and solidification thereof. In the process wherein the unbroken yolks are completely cooked, for example, in a liquid bath, on the order of 10 to 40% by volume of uncooked yolk may be mixed with the cooked yolk during the aforementioned paste making step. Furthermore, in the formation of the yolk paste from either the wholly or partially cooked yolk, other food additives—for example, seasonings, deviling constituents, meats and the like—may be mixed into the paste.

According to a more specific object of the invention, the yolk paste core may be forced into an edible casing about which the albumen layer is subsequently formed. The entire product is completely enclosed in a flexible, synthetic plastic substantially impervious hermetically sealed container, whereby the food package may be stored in a refrigerated condition for a period up to about three months.

Another object of the invention is to provide an egg roll product of improved texture and flavor having a central core consisting of a cooked yolk paste with or without seasonings or other food products, an annular layer of coagulated albumen arranged concentrically about said core, and a substantially impervious flexible synthetic plastic container completely enclosing said roll. In accordance with the preferred embodiment of the invention, the yolk paste core is forced into an edible casing (having a collagen base, for example) that separates the core from the annular albumen layer.

It is still another object of the present invention to provide a new and improved egg product by forming a paste from previously unbroken egg yolks which are partially cooked and using said thick yolk paste in a food product.

Other objects and advantages of the invention will become apparent from a study of the following specification, when considered in the light of the accompanying drawing, in which:

FIG. 1 schematically illustrates one method of forming an egg roll product in accordance with the present invention, use being made of an edible casing between the yolk and white portions; and FIG. 2 illustrates a second method wherein the edible casing is omitted.

In accordance with the subject invention raw uncooked eggs are broken and separated into their albumen and unbroken yolk components either manually or by conventional commercially available egg separating apparatus. The untreated albumen (egg white) is pumped to a storage container for subsequent use.

The separated egg yolks are cooked and made into a paste. According to a first modification of the invention, the yolks are thoroughly cooked by dropping the same into an oil or water bath at a temperature of approximately 190° F. to 240° F. for a period of six to eight minutes. Although the use of an oil or water bath is preferred, the yolks could be cooked by other methods, such as by the use of warm air, dielectric current, or thermal conduction, for example. After cooking the yolk is ground or mashed, and sufficient raw uncooked yolk (on the order of 10% to 40% by volume) is added and mixed with the completely cooked yolk to make a thick paste. According to an alternate modification of the invention, the egg yolk is only partially cooked by dropping the same in the aforementioned oil or water bath for a shorter period of time, whereby the yolk is only approximately 50 to 80% hard cooked. In this case, the partially cooked yolk may be formed into a paste merely by grinding.

If desired, the yolk paste thus produced may be deviled by the addition of common deviled egg additives, such as vinegar, gelatin, salad dressing spices, and the like. Together with, or as an alternative to, the deviled egg additives, the yolk paste may be mixed with other food products, such as ground ham, beef, chicken, pimientos, olives, and the like, that are mixed to taste to enhance the marketability of the resulting egg product.

Referring now to FIGURE 1 of the drawing, the precooked yolk paste, with or without the aforementioned deviling or other food additives, is then transferred to a pressure or stuffing apparatus 2 that forces the same through an extrusion outlet nozzle 4 that discharges a cylindrical core 6 of the paste, under pressure, into a tubular casing 8 of a suitable edible material, such as one having a conventional collagen base. Arranged in concentrically spaced relation about the edible casing 8 is a flexible substantially impervious casing 10 formed of suitable wrapping material (for example, a synthetic plastic material such as polypropylene). The raw albumen 9 is fed from the storage container 12 and is introduced into the annular space between casings 8 and 10.

The casings are then pinched radially inwardly together by a pair of spaced clips 14 and 16 to hermetically seal the food package, whereupon the packages are severed by knife means 18. The resultant package egg roll product 20 which is sealed at opposite ends by the clips 14 and 16, is then cooked (generally in a water bath) for sufficient period of time to effect coagulation of the proteins, depending on the nature of the product desired. For example, in a packaged egg roll product having an outer diameter of approximately 1¾ inches, the product is generally cooked for a period of twenty-one to twenty-three minutes at a water temperature of 195° F.

Depending on the end product desired, this second cooking operation may be such as to effect complete solidification of the yolk core.

The product is then refrigerated and maintained at a temperature of approximately 35 to 45° F. The egg roll may be retained in this refrigerated condition for a period up to approximately three months.

In the alternative method illustrated in FIGURE 2, the edible collagen base casing of FIGURE 1 is eliminated and the precooked yolk paste core 6' is introduced directly into, and is radially spaced from, the tubular synthetic plastic packaging wrapping 10'. The raw albumen 9' is introduced into the annular space defined between the semi-rigid yolk paste core 6' and the wrapper 10, whereupon the ends of the roll are clipped together by clips 14' and 16', and severed by the knife means 18'. The packaged roll is then cooked to effect coagulation of the proteins, and stored under refrigeration until the time of use or consumption.

It is apparent that by precooking the yolks in an unbroken condition, a more uniformly cooked, colored and textured paste is achieved. Furthermore, the use of oil or water bath means for cooking the yolk is permitted, further increasing the control over the uniformity of the yolk.

The grinding and mixing means for forming the yolk paste and for forcing the same through the shaping nozzle 4 may be operated continuously or semi-automatically.

By appropriate selection of the nozzle 4, the paste core may be given a cross-sectional configuration other than a circle, if desired.

The synthetic plastic outer wrapper can be either initially tube like of a selected cross-section, or in the form of a strip that is formed into a tube like form of a selected cross-section adjacent the extrusion nozzle.

While in accordance with the provisions of the patent statutes, the preferred products and methods of the invention have been illustrated and described, it will be apparent to those skilled in the art that various changes may be made in the products and methods described without deviating from the invention set forth in the following claims.

What is claimed is:
1. The method of preparing an egg roll product, which comprises the steps of
    separating raw uncooked eggs into their albumen and and unbroken yolk components;
    cooking each of the unbroken yolks in its membrane to effect incomplete coagulation thereof to cause the yolk to be approximately 50 to 80% hard cooked;
    forming from the said yolk an extrudable thick paste;
    extruding the yolk paste downwardly to form a generally elongated core;
    arranging an impervious open-topped container in substantially concentrically spaced relation about said core, said container having a closed bottom;
    filling by gravity the space between said core and said container with uncooked albumen;
    closing the container; and
    cooking the resultant product to effect complete coagulation of the components thereof.

2. The method of preparing an egg roll product, which comprises the steps of
    separating raw uncooked eggs into their albumen and unbroken yolk components;
    cooking a first part of the unbroken yolks in their membranes to effect complete coagulation thereof;
    blending with the completely coagulated yolk approximately ten to forty percent, by volume, of raw uncooked yolk to form a thick extrudable paste;
    extruding the yolk paste to form a generally elongated core;
    arranging an impervious container in substantially concentrically spaced relation about said core;
    filling the space between said core and said container with uncooked albumen; and
    cooking the resultant product to effect coagulation of the components thereof.

3. The method of preparing an egg roll product, which comprises the steps of
    separating raw uncooked eggs into their albumen and unbroken yolk components;
    cooking a first part of the unbroken yolks in their membranes to effect complete coagulation thereof;
    blending with the completely coagulated yolk approximately ten to forty percent, by volume, of raw uncooked yolk to form a thick extrudable paste;
    extruding the yolk paste downwardly to form a generally elongated vertical core;
    arranging a vertical open-topped impervious container in substantially concentrically spaced relation about said core, said container having a closed bottom;
    filling, by gravity, the space between said core and said container with uncooked albumen;
    closing the top of the container to define a hermetically sealed package;
    and cooking the resultant product to effect coagulation of the components thereof.

4. The method of preparing an egg roll product, which comprises the steps of:
    separating raw uncooked eggs into their albumen and unbroken yolk components;
    cooking the unbroken yolks in their membranes in a liquid bath at a temperature of about 190° F. for a period less than about six minutes to effect incomplete coagulation thereof, whereby the yolk is only approximately 50 to 80% hard cooked;

forming the yolk into a thick extrudable paste;

extruding the yolk paste downwardly to form a generally elongated vertical core;

arranging a vertical open-topped impervious container in substantially concentrically spaced relation about said core, said container having a closed bottom;

filling, by gravity, the space between said core and said container with uncooked albumen;

closing the top of the container to define a hermetically sealed package;

and cooking the resultant product to effect coagulation of the components thereof.

References Cited

UNITED STATES PATENTS

| | | | |
|---|---|---|---|
| 3,071,477 | 1/1963 | Klevens | 99—170 X |
| 3,285,749 | 11/1966 | Shires | 99—113 |

LIONEL M. SHAPIRO, *Primary Examiner.*